(12) United States Patent
Novelo et al.

(10) Patent No.: US 9,435,161 B2
(45) Date of Patent: Sep. 6, 2016

(54) LATCHING ROD BOX

(75) Inventors: Russel Novelo, New Sharon, IA (US); Michael D. Belloma, Centerville, IA (US); Ryan P. Roberts, Knoxville, IA (US); Lucas Laverman, Newton, IA (US); David Langenfeld, Pella, IA (US); Ward Ryon, Saint Joseph, MO (US)

(73) Assignee: Vermeer Manufacturing Company, Pella, IA (US)

( * ) Notice: Subject to any disclaimer, the term of this patent is extended or adjusted under 35 U.S.C. 154(b) by 532 days.

(21) Appl. No.: 13/991,077

(22) PCT Filed: Nov. 29, 2011

(86) PCT No.: PCT/US2011/062340
§ 371 (c)(1),
(2), (4) Date: May 31, 2013

(87) PCT Pub. No.: WO2012/074976
PCT Pub. Date: Jun. 7, 2012

(65) Prior Publication Data
US 2013/0240269 A1 Sep. 19, 2013

Related U.S. Application Data

(60) Provisional application No. 61/418,670, filed on Dec. 1, 2010.

(51) Int. Cl.
*E21B 19/14* (2006.01)
*E21B 19/15* (2006.01)
(Continued)

(52) U.S. Cl.
CPC .......... *E21B 19/15* (2013.01); *B23B 31/1074* (2013.01); *E21B 19/14* (2013.01); *E21B 19/20* (2013.01); *E21B 7/046* (2013.01); *Y10T 29/49826* (2015.01); *Y10T 403/60* (2015.01)

(58) Field of Classification Search
CPC ........ E21B 7/046; E21B 19/14; E21B 19/15; B65D 88/027; B65D 88/022; B65D 85/20; B65D 2590/0008
USPC ............ 172/62, 85; 211/70.4; 206/512, 509; 414/798, 798.1
See application file for complete search history.

(56) References Cited

U.S. PATENT DOCUMENTS 1,631,150 A * 6/1927 Owen ..................... C03B 35/06
193/2 R
5,556,253 A 9/1996 Rozendaal et al.
(Continued)

OTHER PUBLICATIONS

International Search Report for corresponding International Patent Application No. PCT/US2011/062340 mailed Sep. 24, 2012.

*Primary Examiner* — Jennifer H Gay
*Assistant Examiner* — George Gray
(74) *Attorney, Agent, or Firm* — Merchant & Gould P.C.

(57) ABSTRACT

A drilling machine includes a chassis and a primary rod box mounted on the chassis, which includes a rod box interface mechanism positioned adjacent a top of the primary rod box for facilitating interfacing the primary rod box with a supplemental rod box. A rod box interface mechanism automatically secures the rod box to the drilling machine as the rod box is lowered in place on the drilling machine. The rod box interface mechanism can be used to secure a supplemental rod box to a top of a primary rod box that is attached to a chassis of the drilling machine and can be used to secure a rod box directly to the chassis of the drilling machine. Self-aligning features can be used to guide the rod box into place on the drilling machine as the rod box is lowered onto the drilling machine.

12 Claims, 12 Drawing Sheets

(51) Int. Cl.
  *B23B 31/107* (2006.01)
  *E21B 19/20* (2006.01)
  *E21B 7/04* (2006.01)

(56) References Cited

U.S. PATENT DOCUMENTS

| | | | |
|---|---|---|---|
| 5,607,280 A * | 3/1997 | Rozendaal | B65G 59/067 175/52 |
| 6,085,852 A | 7/2000 | Sparks et al. | |
| 6,189,628 B1 | 2/2001 | Jenne | |
| 6,332,502 B1 | 12/2001 | Mills et al. | |
| 6,360,830 B1 | 3/2002 | Price | |
| 6,374,927 B1 | 4/2002 | Guterman et al. | |
| 6,374,928 B1 | 4/2002 | Teller et al. | |
| 6,474,932 B1 | 11/2002 | Rush | |
| 6,814,164 B2 | 11/2004 | Mills et al. | |
| 6,966,106 B1 * | 11/2005 | Roodenburg | E21B 19/14 166/75.11 |
| 7,240,742 B2 | 7/2007 | Sewell et al. | |
| 7,544,036 B1 | 6/2009 | Randall et al. | |
| 7,562,724 B2 | 7/2009 | Allred et al. | |
| 7,600,584 B2 | 10/2009 | Sewell et al. | |
| 7,621,414 B2 * | 11/2009 | Bederke | B65D 90/0013 206/512 |
| 7,694,751 B2 | 4/2010 | Hartke | |
| 2008/0066964 A1 | 3/2008 | Hartke et al. | |
| 2009/0095526 A1 | 4/2009 | Lane et al. | |

* cited by examiner

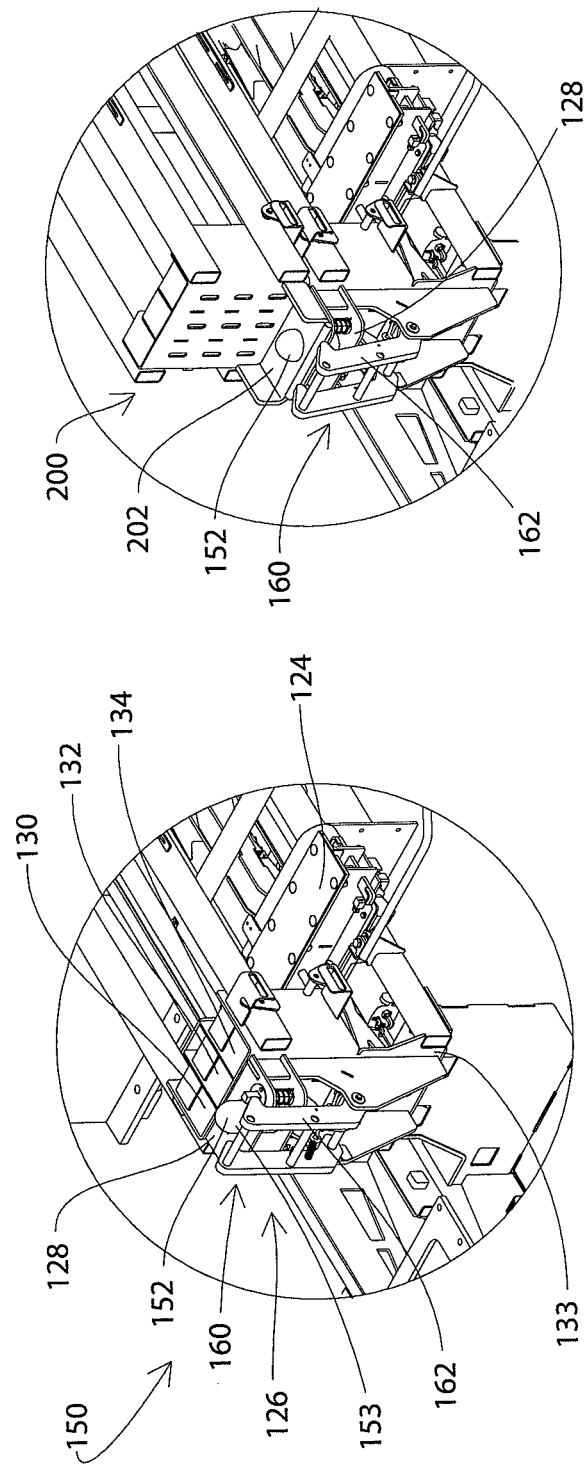

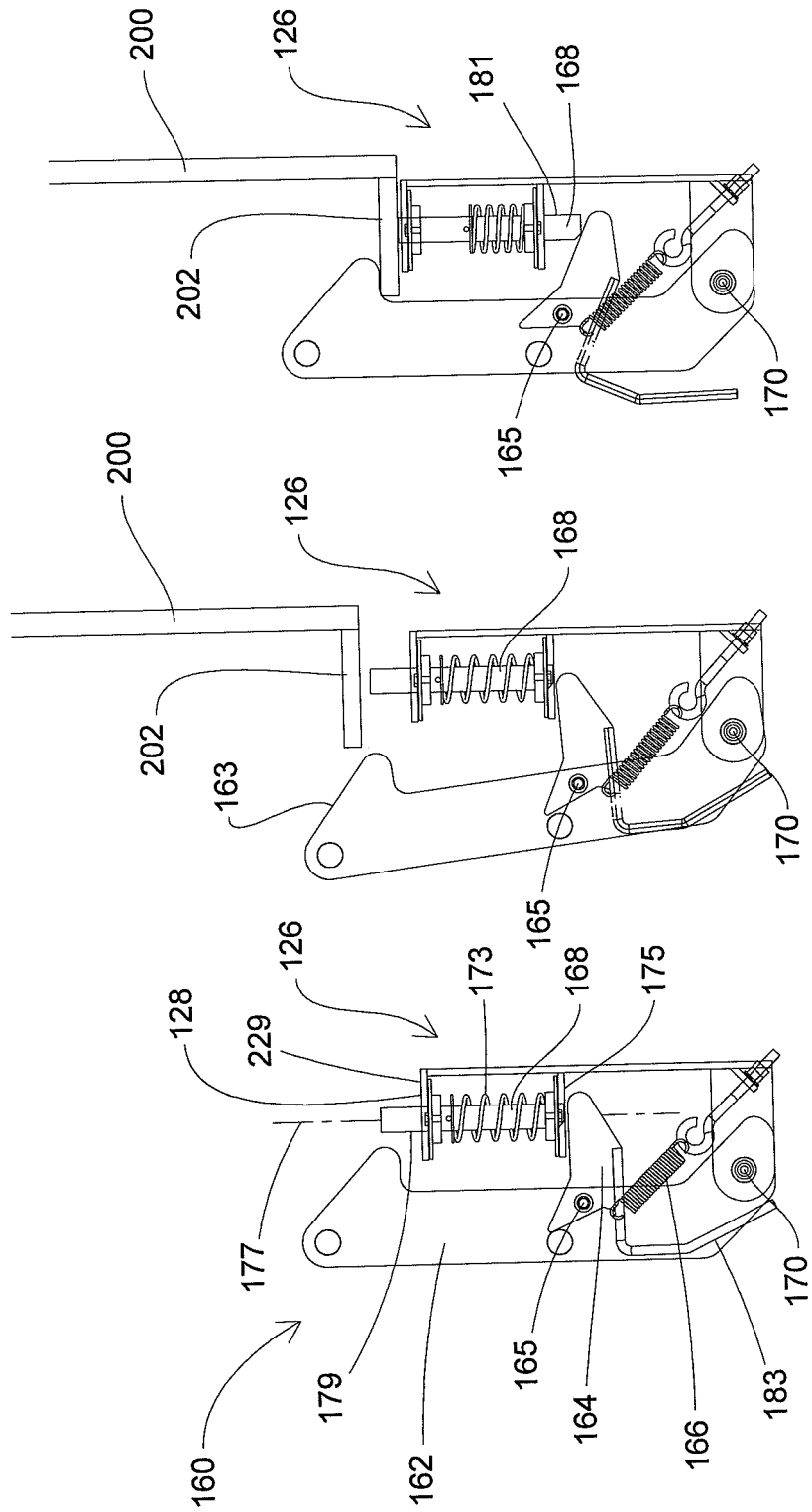

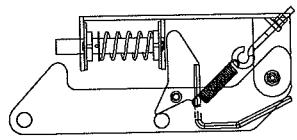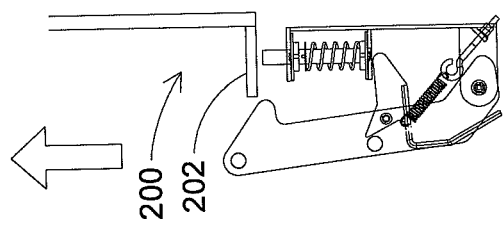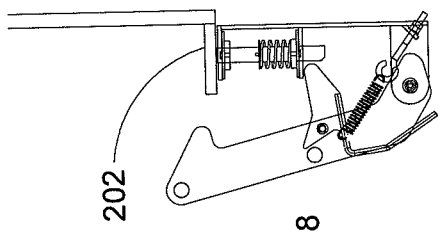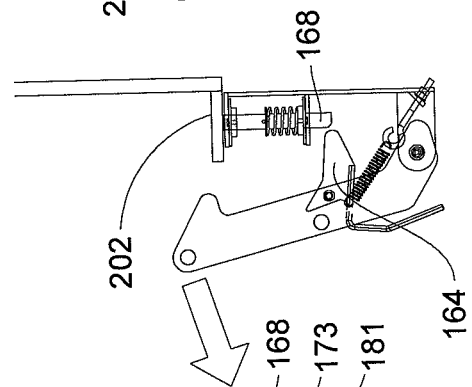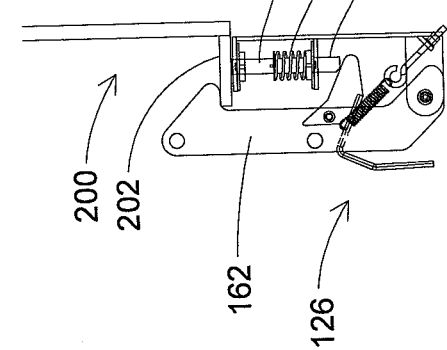

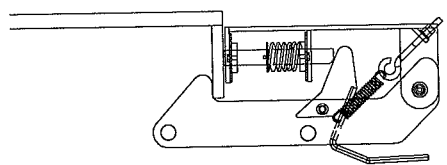
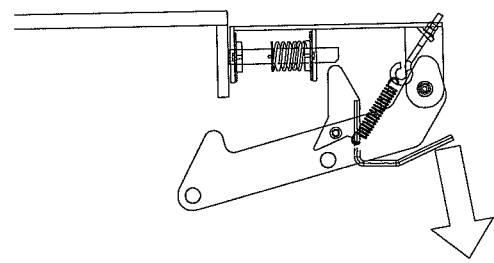
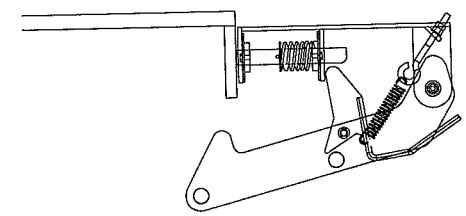
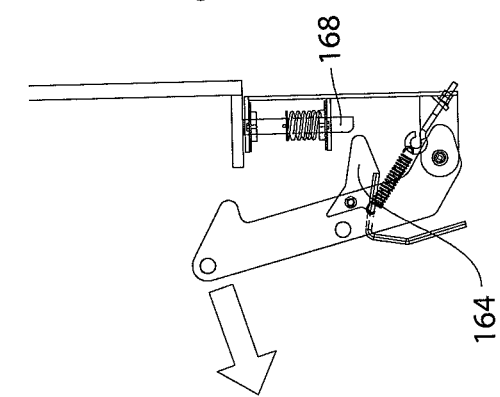
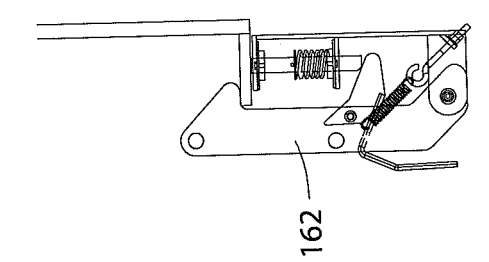

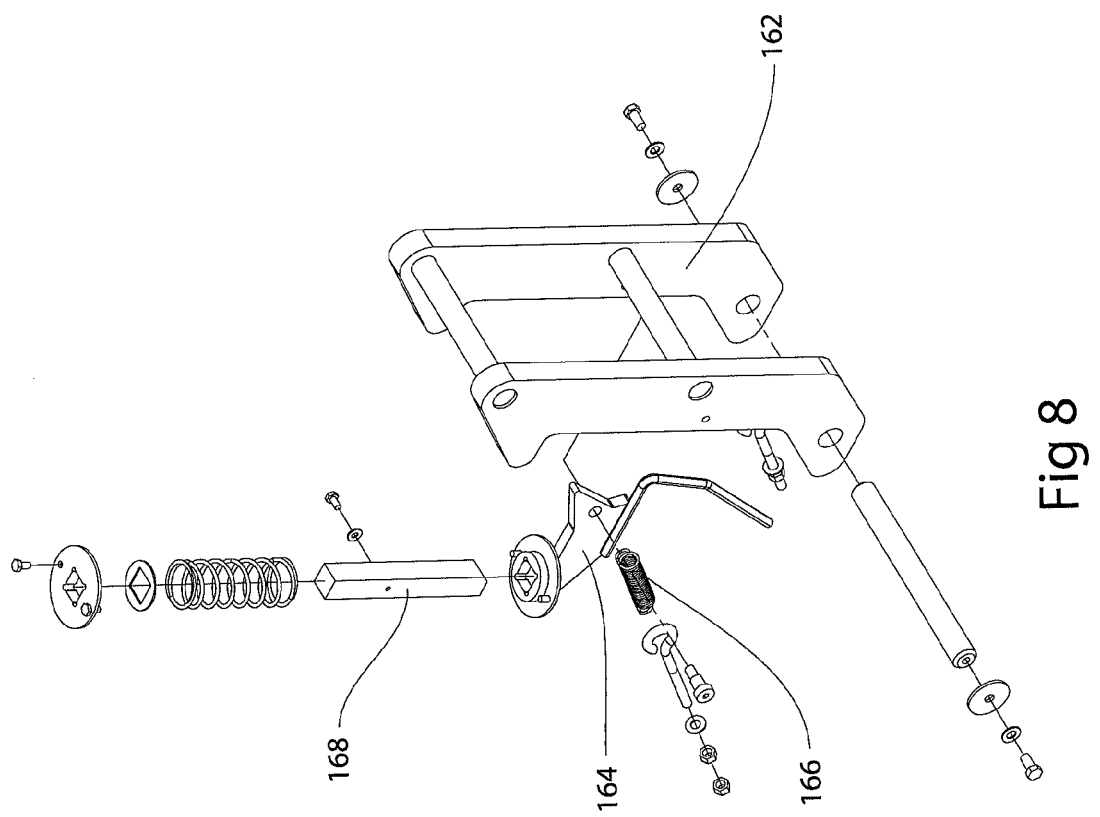

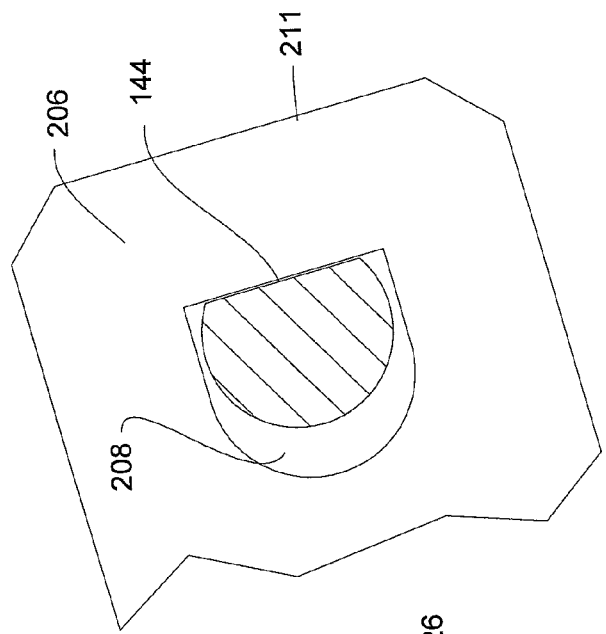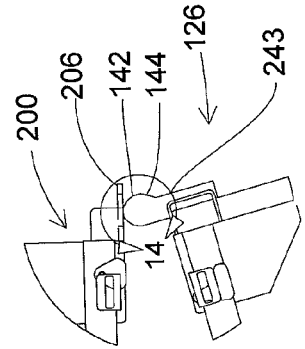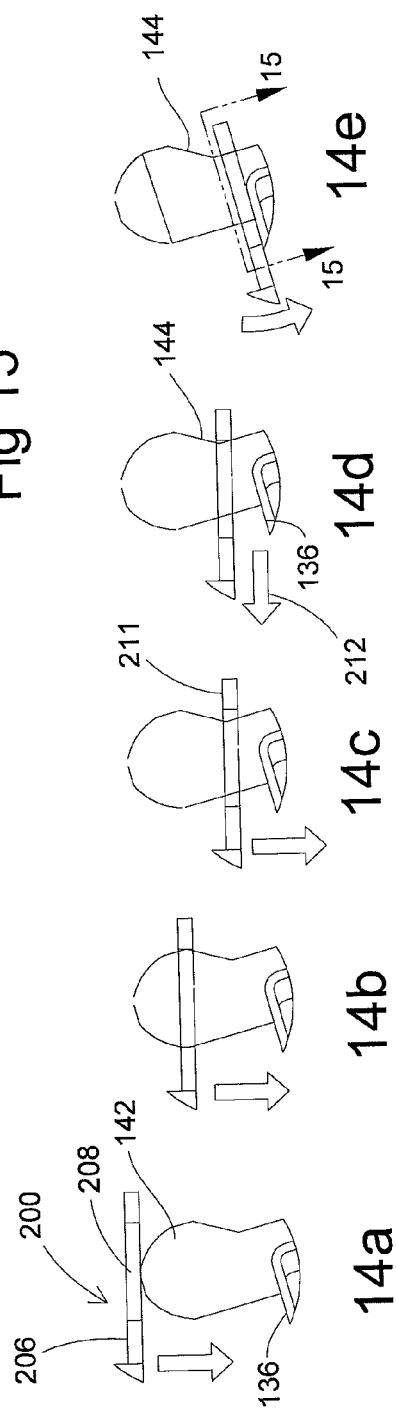

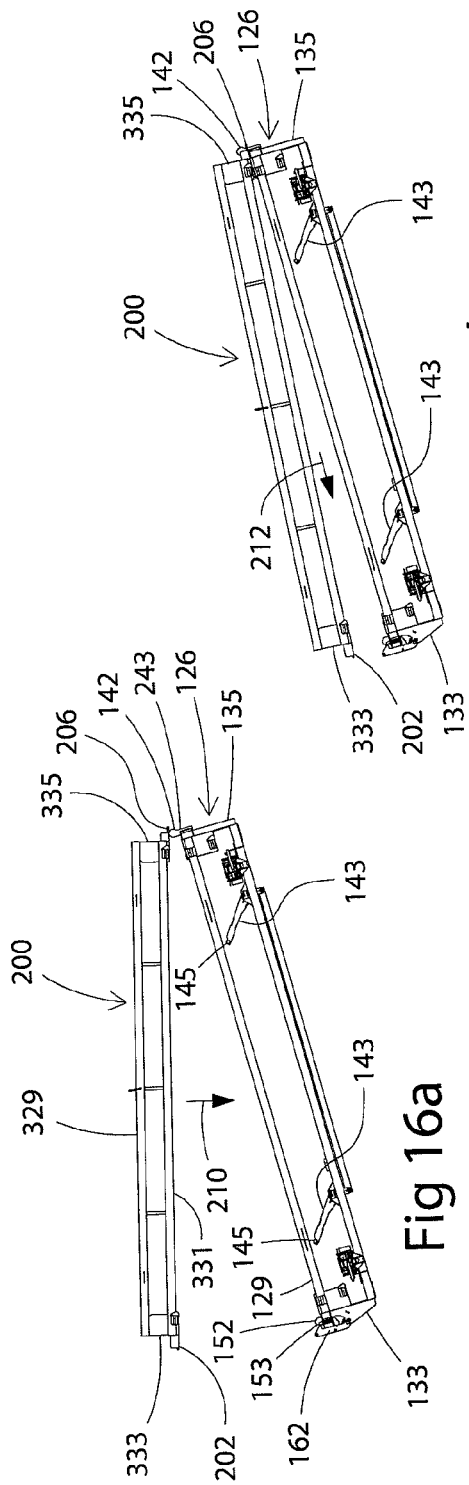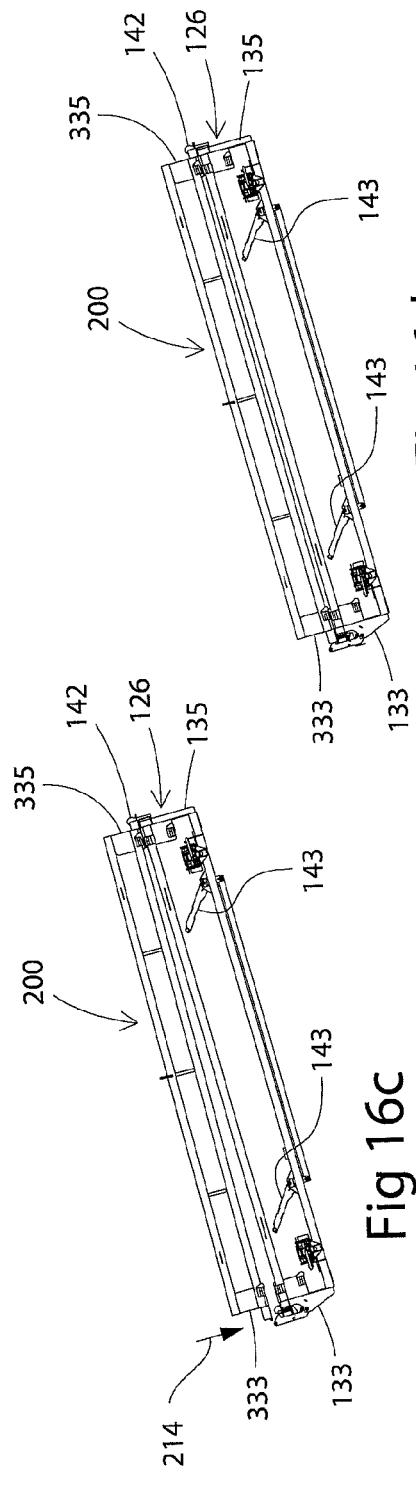

LATCHING ROD BOX

This application is being filed on 29 Nov. 2011, as a PCT International Patent application in the name of Vermeer Manufacturing Company, a U.S. national corporation, applicant for the designation of all countries except the US, and Russel Novelo, Michael D. Belloma, Ryan P. Roberts, Lucas Layerman, David Langenfeld and Ward Ryon, citizens of the U.S., applicants for the designation of the US only, and claims priority to U.S. Provisional Patent Application Ser. No. 61/418,670, filed Dec. 1, 2010, which is incorporated herein by reference.

BACKGROUND

Drill rods used with a horizontal directional drilling machine are commonly stored in containers, commonly called rod boxes. These rod boxes typically store the rods stacked in multiple columns, and are configured for transferring rods out of the bottom of the rod box to a rod loading mechanism which, during a drilling operation, moves the rods from the rod box and into alignment with a drill string. The rod loading mechanism is capable of reversing the direction of transfer, to transfer rods back into the rod box during a pull-back operation. Examples of horizontal directional drilling machines with various types of rod storage and handling mechanisms are described in U.S. Pat. Nos. 6,360,830; 6,332,502; 5,607,280; 5,556,253; 6,474,932; 6,374,928; 7,694,751; 7,562,724; 7,240,742; 6,085,852; 7,600,584; and U.S. Pat. No. 6,374,927, the disclosures of which are hereby incorporated by reference.

For larger drills, that are capable of drilling extended distances, it is not practical to store all the required rods on the machine. Thus, these larger machines typically have the ability to add additional rods to the drill string by removing an empty rod box, and installing a full rod box during a drilling operation, and of reversing that to remove a full rod box, and replace it with an empty box during a pull-back operation.

There is a need for a system to optimize processes related to the handling of the rod boxes.

SUMMARY

One aspect of the present disclosure relates to a drilling machine including a chassis and a primary rod box mounted on the chassis. The drilling machine includes a rod box interface mechanism positioned adjacent a top of the primary rod box for facilitating interfacing the primary rod box with a supplemental rod box.

Another aspect of the present disclosure relates to a rod box interface mechanism that automatically secures a rod box to a drilling machine as the rod box is lowered in place on the drilling machine. In certain embodiments, the rod box interface mechanism is used to secure a supplemental rod box to a top of a primary rod box that is attached to a chassis of the drilling machine. In other embodiments, the rod box interface mechanism can be used to secure a rod box directly to the chassis of the drilling machine.

A further aspect of the present disclosure relates to self-aligning features intended to guide a rod box into place on a drilling machine as the rod box is lowered onto the drilling machine. In one embodiment, the self-alignment features include a tapered alignment pin and a notched alignment pin.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 3a is an enlarged view of a portion of FIG. 1 showing a first retention structure provided at a first end of a primary rod box of the horizontal directional drilling machine of FIG. 1;

FIG. 3b illustrates the first retention device of FIG. 3a being used to latch the first end of the primary rod box to a first end of a supplemental rod box;

FIGS. 5a-5c show a sequence of steps for latching the first end of the supplemental rod box to the first end of the primary rod box;

FIGS. 6a-6e show a sequence of steps for unlatching and removing the supplemental rod box from the primary rod box;

FIGS. 7a-7e show a sequence of steps for temporarily unlatching and then re-latching the supplemental rod box to the primary rod box;

FIG. 8 is an exploded view of a latching assembly of the first retention device of FIG. 3a;

FIG. 13 shows the second end of the supplemental rod box in the process of being coupled to the second end of the primary rod box;

FIGS. 14a-14e show a sequence of steps for interlocking the second end of the supplemental rod box with the second end of the primary rod box;

FIG. 15 is a cross-sectional view taken along section line 15-15 of FIG. 14e; and FIGS. 16a-16d show an overall sequence for securing/attaching the supplemental rod box to the primary rod box.

DETAILED DESCRIPTION

Horizontal directional drilling machines include a variety of mechanical systems with variations that have been developed to meet the needs of a variety of applications. Many of these applications involve bores that are relatively short such as crossing roads or streams and rivers, or installing utilities from a road-side to a residence. The machines typically used for this type of short installation include a drill rod handling device and drill rod storage with enough drill rod carried on the machine for an individual project. However, other applications require significantly longer bores. For such applications, it is not practical for the drill rod storage device of the drilling machine to carry all the drill rods necessary to complete the job, as the drill rod storage device would be unreasonably large. The present disclosure is directed to a drill rod handling system suitable for use in efficiently drilling both long and short bores.

Figure 1:
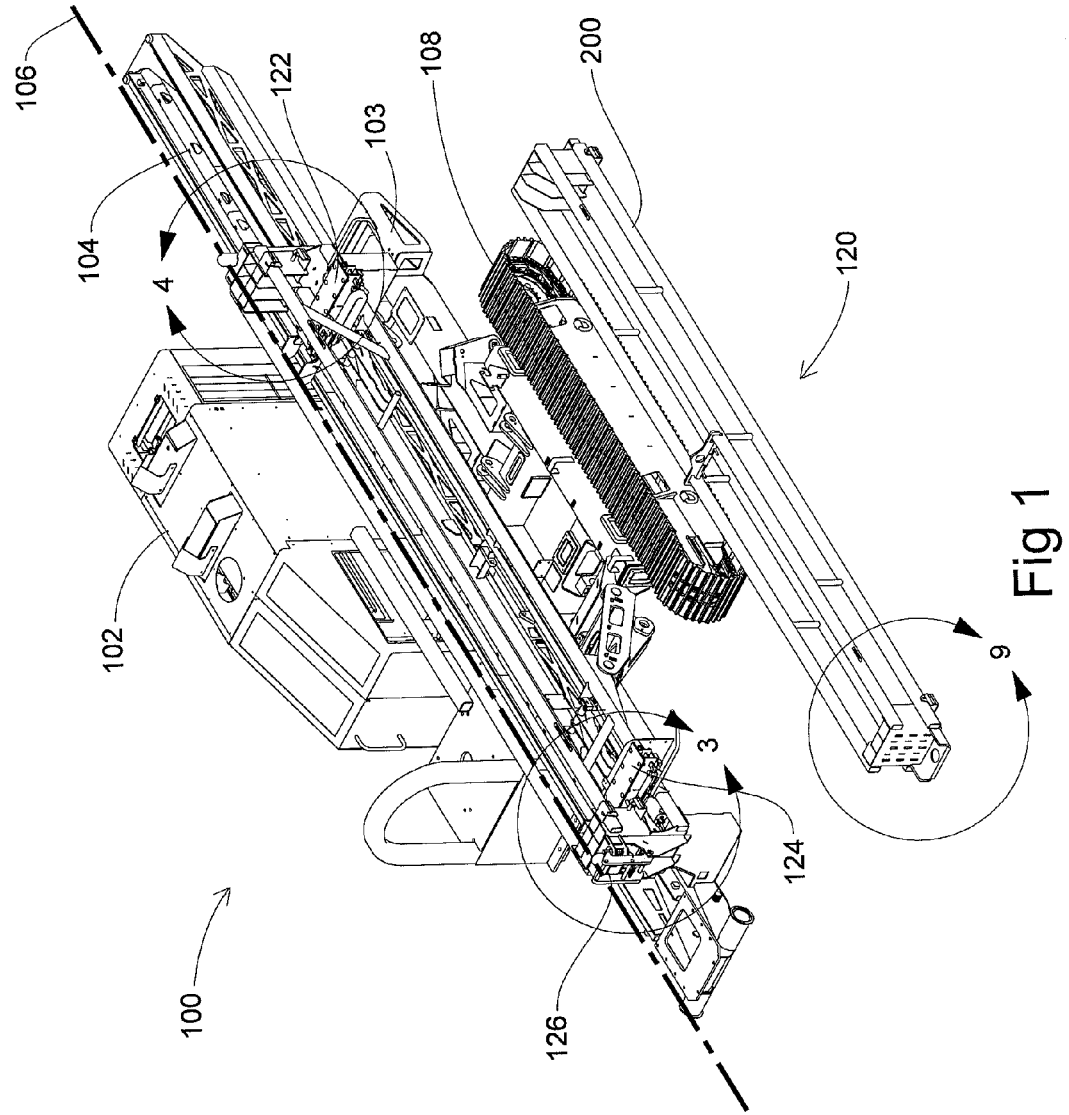
FIG. 1 is a perspective view of a horizontal directional drilling machine in accordance with the principles of the present disclosure.

FIG. 1 illustrates the basic mechanical elements of a horizontal directional drilling machine 100. The drilling machine 100 has a power unit 102 that typically includes a diesel engine and hydraulic pumps. The power unit 102 could alternately include an electric motor. The power unit 102 of this embodiment is mounted to a machine chassis 103 that includes ground drive tracks 108. The drilling machine 100 also includes a drive arrangement for driving the drill string into the ground and for pulling the drill string back from the ground. In certain embodiments, the drive arrangement includes a drive unit (e.g., a gear box) having a rotational driver that provides torque for rotating the drill string about an axis of rotation 106 during drilling operations. The drive unit also can include a thrust/pull-back driver for pushing the drill string into the ground during drilling operations and for pulling the drill string back from the ground during back reaming and/or pull back operations. The drive unit is typically capable of sliding back and forth along the axis of rotation during drilling and pull-back/backreaming operations. Many different drive arrangement configurations are possible. Example drive arrangement configurations may include linear actuators, rack and pinion gear systems or other known mechanical components. An example drive arrangement is disclosed at U.S. Pat. No. 6,814,164, which is hereby incorporated by reference herein in its entirety.

Referring to FIGS. 1-4, the drilling machine 100 includes drill rod handling system 120 including a first rod shuttle 122, a second rod shuttle 124, a primary rod box 126 mounted to the chassis 103, and at least one supplemental rod box 200 that mounts to a top of the primary rod box 126.

Figure 2:
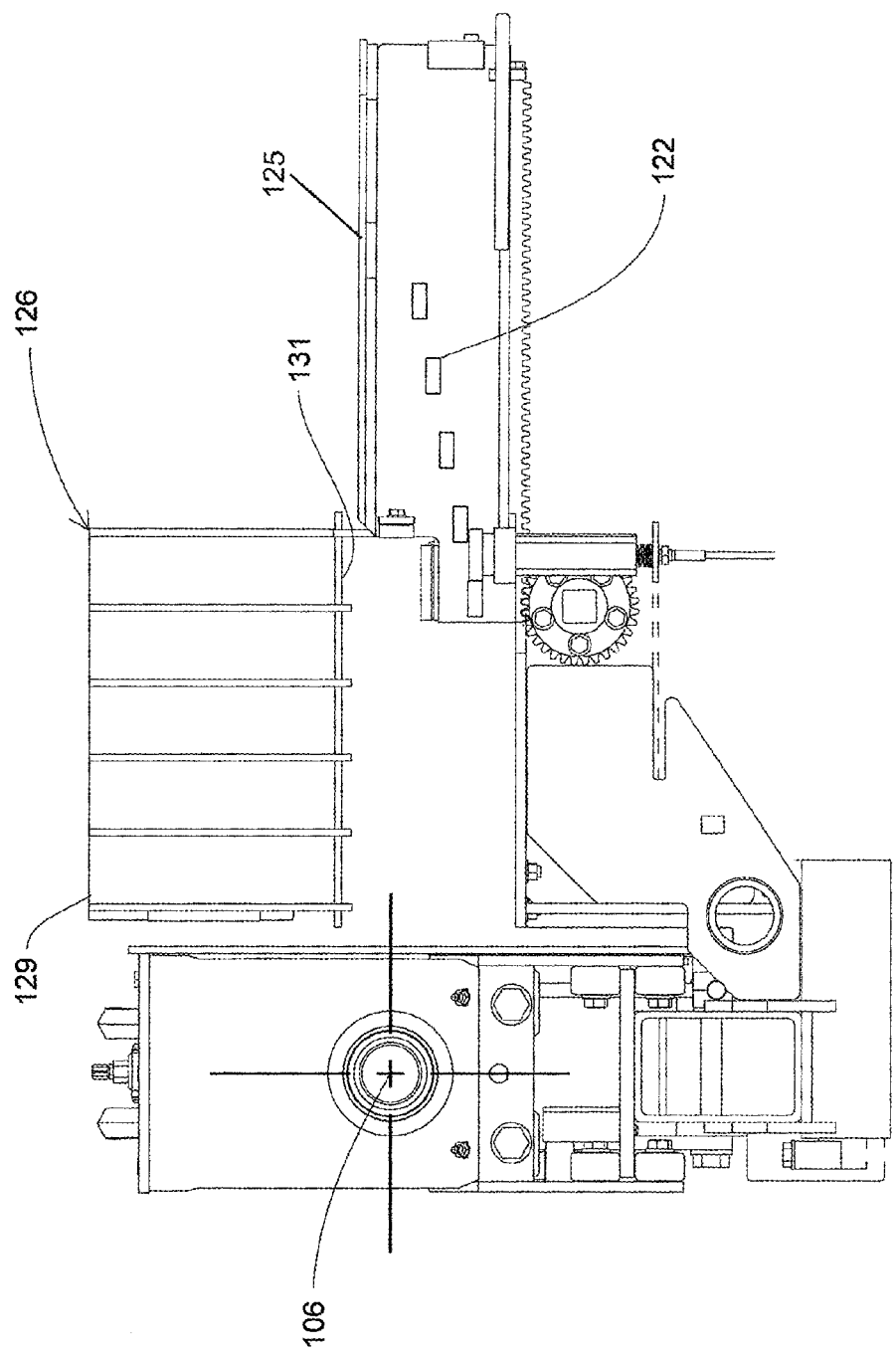
FIG. 2 is a front end view of the horizontal directional drilling machine of FIG. 1.

The rod shuttles 122, 124 can reciprocate along horizontal axes oriented generally perpendicular relative to the axis 106 to move rods back and forth between the bottom discharge of any column of the primary rod box 126 and into alignment with the axis 106 of the drill string. FIG. 2 shows the rod shuttles (the rod shuttle 124 is hidden behind the rod shuttle 122) in a retracted position in which pockets 123 of the rod shuttles are positioned directly beneath a column of the primary rod box 126 from which it is desired to receive a rod. From the retracted position, the shuttles 122, 124 can be moved linearly to an extended position where the pockets 123 are positioned to align a rod held within the pockets 123 with the axis of rotation 106. The shuttles 122, 124 have blocking surfaces 125 that block lower ends of the columns of the primary rod box 126 when the shuttles 122, 124 are in the extended position to prevent the rods from unintentionally falling from the rod box 126. It will be appreciated that the present disclosure is not limited to any particular type of rod transfer device. While a preferred embodiment describes a rod handling system that includes rod boxes that discharge drill rods from the bottom into a rod shuttle device, aspects of the present disclosure can be advantageous for use with any rod handling system.

The primary rod box 126 typically has a rod storage capacity that is only large enough to allow the drilling machine to drill bores of a predetermined length. For longer bores, additional rod capacity can be provided by mounting the supplemental rod box 200 on top of the primary rod box 126. In the depicted embodiment, the primary rod box 126 is connected to the chassis 103 by a first connection type and the supplemental rod box 200 is connected to the primary rod box 126 by a second connection type. The primary rod box 126 is typically not removed from the chassis 103 during normal use of the drilling machine 100. Thus, the first connection can be permanent (e.g., welded) or semi-permanent (e.g., secured in place by a plurality of fasteners such as bolts or other fasteners which typically require tools for assembly and disassembly). In contrast, when drilling long bores multiple supplemental rod boxes 200 may be mounted consecutively to the top of the primary rod box 126. For example, when the primary rod box is empty, a first supplemental rod box is connected to the top of the primary rod box and used to re-fill the primary rod box 126 with rods. Thereafter, if more rods are needed, the first supplemental rod box is removed from the top of the primary rod box 126 and replaced with a second supplemental rod box that is used to re-fill the primary rod box 126. This process is repeated until the bore is complete. Because the supplemental rod boxes are often being connected and disconnected from the primary rod box 126, the second connection type preferably allows the supplemental rod boxes to be quickly and easily connected to and disconnected from the top of the primary rod box 126. Thus, the second connection type preferably allows for quicker connections and disconnections than the first connection type. In a preferred embodiment, the second connection type is a tool-less connection in which separate tools (e.g., wrenches) are not needed by the operator to connect and disconnect the supplemental rod box to and from the primary rod box. In a more preferred embodiment, the supplemental rod box automatically connects to the primary rod box when the supplemental rod box is lowered on the primary rod box.

Figure 10:
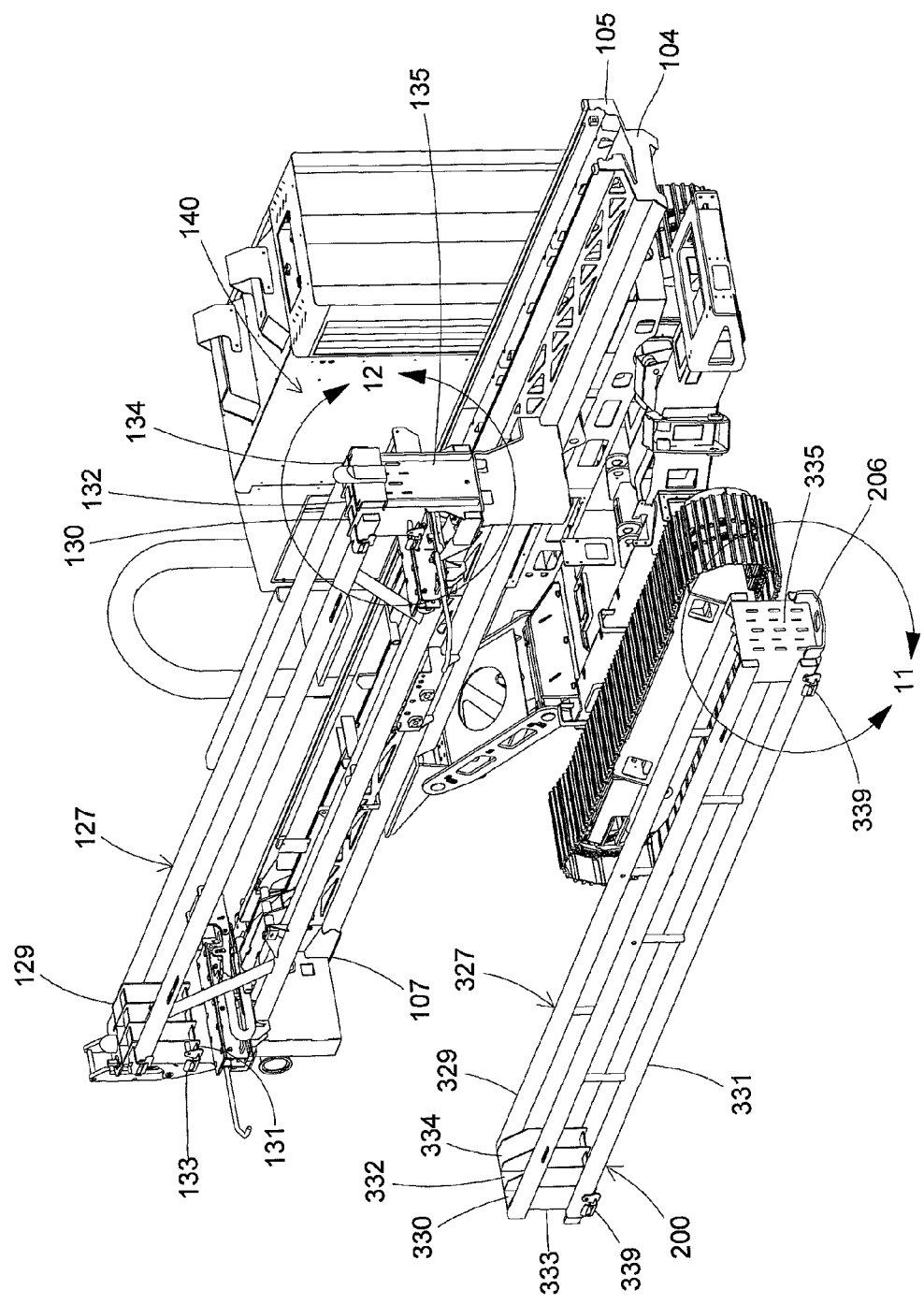
FIG. 10 is another perspective view of the horizontal directional drilling machine of FIG. 1.

Referring to FIG. 10, the primary rod box 126 of the drilling machine 100 includes a magazine frame 127 defining a rod storage region having a top 129 and a bottom 131. The magazine frame 127 defines a plurality of vertical columns 130, 132 and 134 that extend from the top 129 to the bottom 131 of the rod storage region of the magazine frame 127. The columns 130, 132 and 134 have lengths that extend from a first end 133 to a second end 135 of the magazine frame 127. The columns have open top and bottom ends. The shuttles 122, 124 are mounted beneath the open bottom ends of the columns 130, 132, 134 of the primary rod box 126.

The primary rod box 126 is attached to an elongated frame 104 of the chassis 103. The frame 104 is pivotally movable relative to a main body of the chassis 103 between a horizontal position (see FIG. 10) and an angled position. When the frame 104 is in the angled position, a first end 105 of the frame 104 is elevated relative to a second end 107 of the frame 104. The primary rod box 126 is carried by the frame 104 as the frame is pivoted between the horizontal and angled positions. When the frame 104 is in the horizontal position, both ends 133, 135 of the rod box 126 are at the same elevation and both of the shuttles 122, 124 are at the same elevation. When the frame is in the angled orientation, the first end 133 of the rod box is at a lower elevation than the second end 135 of the rod box 126 (see FIGS. 16a-16d) and the first shuttle 122 is at a lower elevation than the second shuttle 124.

Referring still to FIG. 10, the supplemental rod box 200 of the drilling machine 100 includes a magazine frame 327 defining a top 329 and a bottom 331. The magazine frame 327 defines a plurality of vertical columns 330, 332 and 334 that extend from the top 329 to the bottom 331 of the magazine frame 327. The columns 330, 332 and 334 have lengths that extend from a first end 333 to a second end 335 of the magazine frame 327. The columns 330, 332, 334 are open at the top 329 and bottom 331 of the magazine frame 327 and are adapted to align with the columns 130, 132 and 134 of the primary rod box 126 when the supplemental rod box 200 is mounted on the primary rod box 126. Removable retaining members 339 can be mounted across the open lower ends of the columns 330, 332 and 334 at the bottom 331 of the magazine frame 327 to prevent the rods from falling from the open lower ends of the columns 330, 332 and 334 during transit of the supplemental rod box 200.

Referring to FIGS. 16a-16d, the drilling machine 100 also includes a pair of lift arms 143 for raising and lowering the rods within the primary rod box 126. The lift arms include rod support portions 145 on which the rods of the primary rod box 126 rest. By pivoting the lift arms 143 from an intermediate position where the rod support portions 145 are positioned slightly higher than the blocking surfaces 125 of the shuttles 122, 124 to a fully lowered position where the rod support portions 145 are lower than the pockets 123 of the shuttles 122, 124, a rod from a column positioned over the pockets 123 can be lowered into the pockets 123. The lifting arms 143 are also movable from the intermediate position to a fully raised position where the rod support portions 145 are positioned above the top 129 of the primary rod box 126. When a loaded supplemental rod box 200 is initially mounted on the top 129 of the primary rod box 126 while the primary rod box 126 is empty, the lifting arms 143 can be moved to the fully raised position thereby causing the lifting arms to lift the rods slightly within the supplemental rod box 200 to allow rod retaining members 339 to be removed from the bottom of the supplemental rod box 200. Once the rod retaining members 339 have been removed from the supplemental rod box, the rods held within the columns of the supplemental rod box 200 can be lowered by the lifting arms 143 into the corresponding columns 130, 132, 134 of the primary rod box 126.

The primary rod box 126 includes a rod box interface mechanism at the top of the primary rod box 126 for facilitating interfacing the primary rod box 126 with the supplemental rod box 200. In one embodiment, the rod box interface mechanism can include a rod box retention arrangement configured to automatically latch the supplemental rod box 200 to the top of the primary rod box 126 when the supplemental rod box 200 is lowered onto the primary rod box 126. The rod box retention arrangement can include a first retention structure 150 (see FIG. 3a) positioned adjacent the first end 133 of the magazine frame 127 and a second retention structure 140 (see FIGS. 4 and 12) provided adjacent the second end 135 of the magazine frame 127. The first retention structure 150 includes a first guide pin 152 that projects upwardly from a top surface of the magazine frame 127 and a latch mechanism 160 including a latching arm 162. The second retention structure 140 includes a second guide pin 142 including an undercut region 243 defining a catch 144 formed by a bevel. The undercut region 243 faces away from the first guide pin 152. In certain embodiments, the catch can be formed by a beveled portion of the second pin 142 or by a slight misalignment of the second pin 142. The first guide pin 152 has a tapered configuration with a tapered portion 153 that faces away from the second guide pin 142 and that diverges from the second guide pin 142 as the tapered portion 153 extends in a downward direction.

Figure 11:
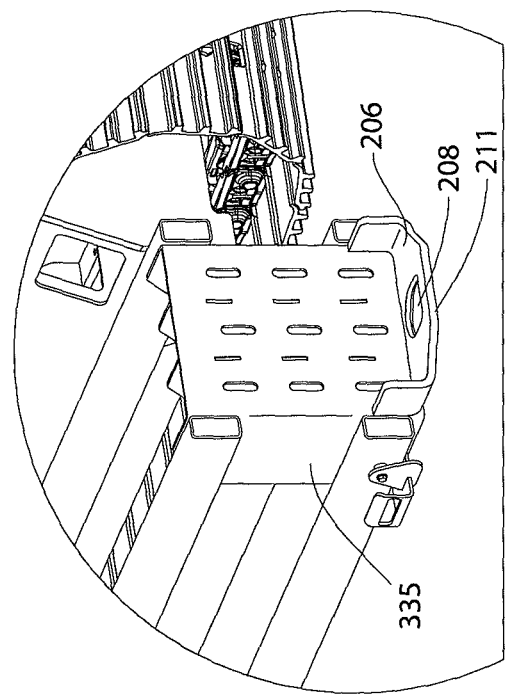
FIG. 11 is an enlarged view of a portion of FIG. 10 showing a second end of the supplemental rod box.
Figure 9:
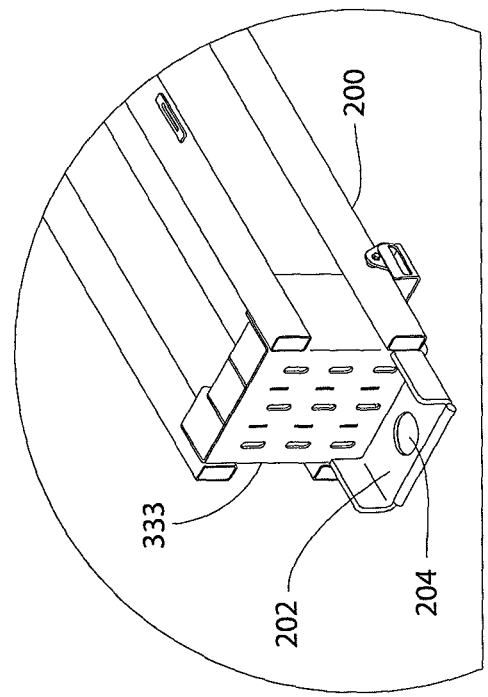
FIG. 9 is a perspective view of a first end of the supplemental rod box.

The supplemental rod box 200 includes structure that interfaces with the first and second retention structures 150, 140. For example, the supplemental rod box 200 includes first and second flanges 202, 206 mounted at the bottom of the magazine frame 327. The first flange 202 (see FIG. 9) is positioned at the first end 333 of the magazine frame 324 and the second flange 206 (see FIG. 11) is positioned at the second end 335 of the magazine frame 327. The first flange 202 defines a first flange opening 204 and the second flange 206 defines a second flange opening 208. When the supplemental rod box 200 is mounted on the primary rod box 126, the first guide pin 152 is received within the first flange opening 204 and the second guide pin 142 is received within the second flange opening 208.

FIGS. 16a-16d show a sequence for attaching the supplemental rod box 200 to the top of the primary rod box 126. Initially, the supplemental rod box 200 in maneuvered such that the second guide pin 142 is received within the second flange opening 208 (see FIG. 16a) and the first flange is elevated above the first guide 152. Next, the supplemental rod box 200 is pivoted downwardly about the second guide pin 142 such that the first flange opening 208 moves toward the first guide pin 152 (see FIGS. 16b and 16c). As the supplemental rod box 200 is pivoted downwardly, a tip of the first guide pin 152 is received within the first flange opening 204. Continued downward movement of the first end 333 of the supplemental rod box 200 causes the first flange 202 to slide along the tapered portion 153 of the first guide pin 152 which causes the supplemental rod box 200 to slide in a direction 212 which is generally parallel to the axis of rotation 106. As the supplemental rod box 200 slides in the direction 212, an end portion 211 of the second flange 206 slides toward the first guide pin 152 into the undercut region 243 of the second guide pin 142 beneath the catch 144. In this position, interference between the second flange 206 and the catch 144 provides an interlock that prevents the flange 206 from being lifted off of the second guide pin 142. Once the supplemental rod box 200 slides in the downward direction 147 a sufficient distance for the first guide pin 152 to pass fully through the first flange opening 204, the first flange 202 seats on the top surface 129 of the magazine frame 127 and the latching arm 162 automatically latches over the first flange 202 such that the first flange 202 is prevented from being lifted off the first guide pin 152. In this way, by latching the flanges 202, 206 to the top of the primary rod box 126, the supplemental rod box 200 is securely connected to the top side of the primary rod box 126.

FIGS. 3a, 3b, 5a-5c, 6a-6e and 7a-7e show the latch mechanism 160 in a variety of configurations illustrating its functions. FIG. 5a illustrates the basic components of the latch mechanism 160 including the latching arm 162, a latch dog 164, a latch assembly biasing device 166 (e.g., a coil extension spring), and a plunger 168. The latching arm 164 is pivotally connected to the primary rod box 126 at pivot axis 170 and is pivotally movable between a latching position (see FIGS. 5a and 5c) and a non-latching position (see FIG. 6c). The top of the frame magazine 127 of the primary rod box 126 includes an upper wall 129 having an upper surface 128 on which the first end 333 of the supplemental rod box 200 seats when the supplemental rod box 200 is latched to the primary rod box 126. A coil spring 173 or other biasing member is mounted between the upper wall 229 and a lower plunger mounting wall 175 attached to the first end 133 of the primary rod box 126. The plunger 168 is able to slide relative to the walls 229, 175 along a vertical axis 177. The plunger 168 is movable along the axis 177 between an upper position (see FIGS. 5a and 5b) and a lower position (see FIG. 5c). In the upper position, the plunger 168 extends through an opening in the upper wall 229 such that an upper portion 179 of the plunger 168 projects above the top surface 128. In the lower position, the plunger 168 extends through an opening in the wall 175 such that a lower portion 181 of the plunger 168 projects below a bottom surface of the wall 175. The spring 173 biases the plunger toward the upper position.

The latch assembly biasing device 166 biases the latching arm 162 toward the latching position. The latch dog 164 is pivotally connected to the latching arm 162 at pivot axis 165. The latch dog 164 is pivotally movable about the pivot axis 165 relative to the latching arm 162 between an upper position (see FIGS. 5a and 5b) and a lower position (see FIG. 5c). The latch assembly biasing device 166 biases the latch dog 164 toward the upper position. A lever 183 can be used by an operator to manually pivot the latch dog 164 from the upper position to the lower position.

A sequence for latching the flange 202 of the supplemental rod box 200 to the upper wall 229 of the primary rod box is shown at FIGS. 5a-5c. FIG. 5a shows the latching arm 162 in the latching position prior to mounting the supplemental rod box 200 on the primary rod box 126. FIG. 5b illustrates the supplemental rod box 200 in the process of being positioned on top of the primary rod box 126, where the flange 202 contacts an angled ramp surface 163 of the latching arm 162. Upon contact between the flange 202 and the ramp surface 163, the weight of the supplemental rod box 200 is sufficient to overcome the bias of the biasing device 166 and force the latching arm 162 to rotate counter clockwise about its mounting axis 170 toward the non-latching position. Once the removable rod box 200 is seated against the upper surface 128, the latching arm 162 is able to rotate clockwise, due to biasing device 166, to engage flange 202, thus locking the supplemental rod box 200 to the primary rod box 126, without requiring an operator to do anything more than to position and lower the supplemental rod box 200 into position.

As the supplemental rod box 200 moves into the seated position, flange 202 forces the plunger 168 down as illustrated in FIG. 5c. This device serves a function for removing the supplemental rod box 200, as illustrated in FIGS. 6a-e. FIG. 6a is the same as FIG. 5c, with the removable rod box 200 seated on the primary rod box 126, and retained by the latching arm 162. In the position of FIG. 6a, the lower portion 181 of the plunger 168 engages the latch dog 164 to retain the latch dog in the lower pivot position. If an operator wishes to remove the supplemental rod box 200, the first step is to reposition the latch plate 162, by manually moving it counter-clockwise to the non-latching position as shown in FIG. 6b. When the latching arm 162 reaches the non-latching position, the latch dog 164 disengages from the bottom end of the lower portion 181 of the plunger 168 and the biasing device 166 pivots the latch dog 164 to the upper pivot position. The latching arm 162 is then released and the biasing device 166 moves the latching arm slightly back toward the latching position until the latch dog 164 contacts the side of the lower portion 181 of the plunger 168 (see FIG. 6c). Contact between the latch dog 164 and the side of the lower portion 181 of the plunger 168 retains the latching arm in the non-latching position. The supplemental rod box 200 can then be lifted off the primary rod box 126, as illustrated in FIG. 6d, without interference from the latching arm 162. As the supplemental rod box is lifted, the spring 173 causes the plunger 168 to move back to the upper position. When the plunger moves back to the upper position, the lower portion of the plunger 168 disengages from latch dog 164 thereby allowing the biasing device 166 to return the latching arm back to the latching position (see FIG. 6e).

FIGS. 7a-e illustrate a sequence of steps that allow an operator to initially decide to remove the supplemental rod box 200, but then decide to leave it attached and locked. FIGS. 7a-c are the same as FIGS. 6a-c, illustrating that the latching arm 162 can be manually moved to an unlocked position illustrated in FIG. 7c where the latch dog 164 has engaged the side of the plunger 168. If the operator decides to re-latch the supplemental rod box 200, without moving the supplemental rod box 200, then the lever 183 can be used to rotate the latch dog 164 clock-wise as illustrated in FIG. 7d, until it clears the bottom end of the plunger 168, and the latching arm 162 snaps back to the latched position illustrated in FIG. 7e.

The latch mechanism 160 is a component of the first retention device 150 illustrated in FIGS. 3a and 3b, also including the guide pin 152. When engaged with the flange 202 of the supplemental rod box 200, the latch mechanism holds the supplemental rod box 200 from moving in a vertical direction relative to the primary rod box 126. The guide pin 152, when engaged with the aperture 204 in the flange 202, illustrated in FIG. 9, holds the supplemental rod box 200 from moving in other directions.

Figure 12:
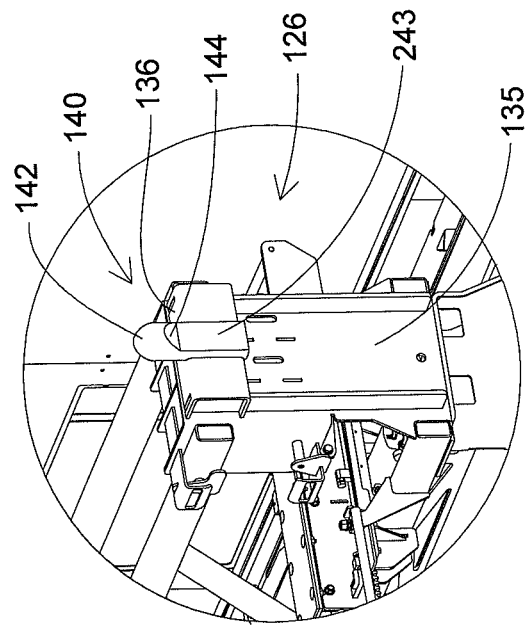
FIG. 12 is an enlarged view of a portion of FIG. 10 showing an enlarged view of a second end of the primary rod box.
Figure 4:
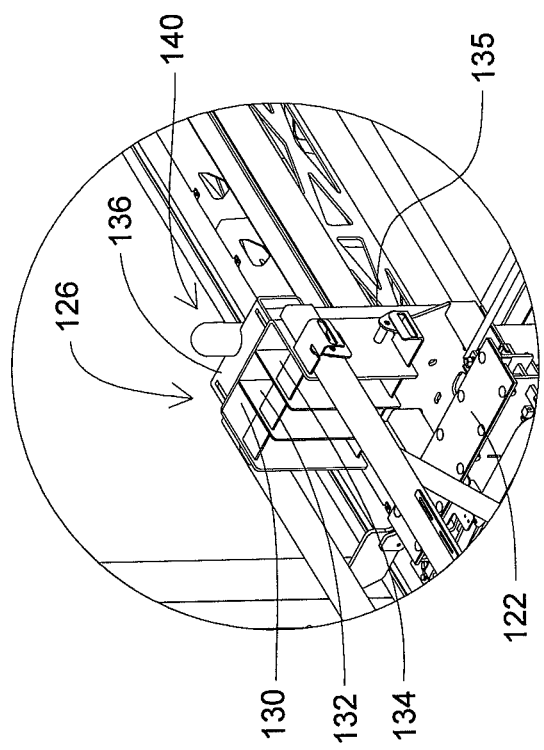
FIG. 4 is an enlarged view of a portion of FIG. 1 showing a second retention device provided at a second end of the primary rod box.

The second retention device 140 illustrated in FIG. 4, is shown from a different perspective in FIGS. 10 and 12. The rear side of the primary rod box 126 includes an upper surface 136 and the retention device 140. The retention device includes the second guide pin 142 with an upper tapered section. This pin 142 is illustrated in greater detail in FIG. 13, that also shows the supplemental rod box 200 as it is being lowered to engage with the primary rod box 126. The aperture 208 in the flange 206, shown in FIG. 11, will mate with the upper portion of the guide pin 142 as shown in greater detail in FIGS. 14a-e. FIG. 14a illustrates the flange 206 and aperture 208 as it begins to engage with the pin 142. The flange will slide over the pin as the supplemental rod box 200 is lowered straight down as indicated in FIGS. 14a, 14b and 14c. At some point rod box 200 can move in direction 212 (i.e., toward the first guide pin 152) as allowed by the beveled catch 144 and the undercut region 243, as shown in FIG. 14d. This movement is necessary to align the first guide pin 152 with aperture 204 of the flange 202. The supplemental rod box 200 will be completely seated when it rotates counter clockwise as illustrated in FIG. 14e so that it will rest on upper surface 136 defined by the top 129 of the primary rod box 126. FIG. 15 illustrates the shape of the aperture 208 in flange 206 as it is engaged with the guide pin 142 in the position shown in FIG. 14e.

The supplemental rod box 200 is secured to the primary rod box 126 when the second flange 206, with aperture 208, is engaged with the second guide pin 142, and the first flange 202, with aperture 204, is engaged with the first guide pin 152, and the latch mechanism 160 is also engaged with the flange 202. Each of these three connections occurs automatically, as the operator lowers the removable rod box onto the primary rod box. The overall process is depicted in FIGS. 16a-d, with FIG. 16a showing the supplemental rod box 200 positioned above the primary rod box 126, with the aperture 208 in flange 206 aligned with the pin 142. The operator lowers the supplemental rod box 200 in a first direction 210, generally straight down. Once the flange 206 contacts the upper surface 136 the supplemental rod box 200 will move in a second manner including some portion of sliding movement in a second direction 212 as illustrated in FIG. 16b and in a third manner where the end 333 moves generally along an arc segment defined by a radius swung about the end 335 along the direction shown as 214 in FIG. 16c. The process is complete when the removable box is seated on surfaces 136 and 128, the pins 152 and 142, are fully engaged with the apertures 204 and 208 and the latch mechanism engages the flange 202, as illustrated in FIG. 16d.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. An attachment arrangement for attaching a rod box to another structure, the attachment arrangement comprising:
   first and second spaced-apart flanges, the first flange defining a first opening and the second flange defining a second flange opening;
   a first guide pin that is received in the first opening of the first flange;
   a second guide pin that is received in the second opening of the second flange, the second guide pin being configured such that interference between the second flange and a portion of the second guide pin prevents the second guide pin from being removed from the second opening when the rod box is attached to the structure;
   a latching arm that latches the first flange when the rod box is attached to the structure to prevent the first guide pin from being removed from the first opening; and
   a latch dog pivotally connected to the latching arm, the latch dog being movable between a first position and a second position and wherein the latch dog is biased toward the first position.

2. The attachment arrangement of claim 1, wherein the first and second flanges are mounted to a bottom of the rod box adjacent opposite ends of the rod box, and wherein the first guide pin, the second guide pin, and the latching arm are mounted to the structure.

3. The attachment arrangement of claim 2, wherein the rod box comprises a supplemental rod box, wherein the structure includes a primary rod box attached to a chassis of a horizontal drilling machine, and wherein the first guide pin, the second guide pin, and the latching arm are mounted adjacent a top of the primary rod box.

4. The attachment arrangement of claim 1, wherein the latching arm is spring biased toward a latching position.

5. The attachment arrangement of claim 4, further comprising a plunger that is actuated by the first flange when the rod box is attached to the structure, wherein the latch dog engages a side of the actuated plunger to retain the latching arm in a non-latching position, and wherein the latch dog engages an end of the plunger when the latching arm is in the latching position.

6. The attachment arrangement of claim 5, further comprising a lever attached to the latch dog for manually pivoting the latch dog relative to the latching arm.

7. The attachment arrangement of claim 1, wherein the latch dog is configured to retain the latching arm in a non-latching position.

8. The attachment arrangement of claim 1, further comprising a lever attached to the latch dog, the lever being configured to allow an operator to manually pivot the latch dog from the first position to the second position.

9. A method of securing a rod box to a horizontal directional drilling system comprising:
   a. a chassis with an elongated rack frame for supporting a gearbox that travels along a longitudinal axis defining a drill string axis;
   b. a first rod box mount positioned adjacent the drill string axis and adjacent a first end of the rack frame, having a first pin that is generally perpendicular to the drill string axis, the mount further comprising a first mount surface generally parallel to the drill sting axis with a latch mechanism;
   c. a second rod box mount positioned adjacent the drill string axis and adjacent a second end of the rack frame, having a second pin that is generally perpendicular to the drill string axis, the mount further comprising a second mount surface generally parallel to the drill sting axis; and
   d. an elongated rod box with a first flange having an aperture on one end, and a second flange having an aperture on the opposite end; the method comprising:
   e. positioning the rod box with the second aperture aligned with a first end of the second pin while the first aperture is misaligned with the first pin;
   f. then moving the rod box in a first direction generally perpendicular to the drill string axis so that the aperture of the second flange partially engages the pin of the second rod box mount;
   g. then moving the rod box in a second direction generally parallel to the drill string axis, as allowed by either a beveled portion of the second pin or by a slight misalignment of the second pin, to a position where the first aperture is aligned with a first end of the first pin; and
   h. then moving the rod box in a direction generally perpendicular to the drill string axis until the first flange is seated on the first mount surface wherein the first flange engages with a latch that secures the rod box from moving in a direction aligned with the axis of the first pin.

10. The method of claim 9, wherein the first flange engages a spring loaded plunger when seated on the first mount surface.

11. A method for securing a rod box to a directional drilling machine using an attachment interface including a first interface location spaced from a second interface location, the first interface location including a first guide pin, a first opening defining structure defining a first opening and a latching arm, the second interface location including a second guide pin and a second opening defining structure defining a second opening, the method comprising:
   inserting the second guide pin through the second opening while the first guide pin is not yet received in the first opening;
   then pivoting the rod box relative to the second guide pin to cause the first guide pin to be received in the first opening while concurrently sliding the rod box toward the first interface location thereby causing the second opening defining structure and the second guide pin to be moved to an interlocked orientation; and
   then latching the first opening defining structure with the latching arm after the second opening defining structure and the second guide pin have been moved to the interlocked orientation.

12. The method of claim 11, wherein the latching arm automatically moves to a latched position when the first guide pin is fully received within the first opening.

* * * * *